US010313796B2

(12) United States Patent
Fürst et al.

(10) Patent No.: US 10,313,796 B2
(45) **Date of Patent: *Jun. 4, 2019**

(54) VAD DETECTION MICROPHONE AND METHOD OF OPERATING THE SAME

(71) Applicant: Knowles Electronics, LLC, Itasca, IL (US)

(72) Inventors: Claus Erdmann Fürst, Roskilde (DK); Henrik Thomsen, Holte (DK); Michael Deruginsky, Hillerød (DK); Dibyendu Nandy, Naperville, IL (US); Oddy Nopporn Khamharn, Addison, IL (US)

(73) Assignee: Knowles Electronics, LLC, Itasca, IL (US)

(*) Notice: Subject to any disclaimer, the term of this patent is extended or adjusted under 35 U.S.C. 154(b) by 742 days.

This patent is subject to a terminal disclaimer.

(21) Appl. No.: 14/824,736

(22) Filed: Aug. 12, 2015

(65) Prior Publication Data

US 2015/0350774 A1 Dec. 3, 2015

Related U.S. Application Data

(63) Continuation of application No. 14/522,158, filed on Oct. 23, 2014, now Pat. No. 9,113,263, which is a (Continued)

(51) Int. Cl.

*H04R 3/00* (2006.01)
*H04R 17/02* (2006.01)

(Continued)

(52) U.S. Cl.

CPC ............ *H04R 17/02* (2013.01); *G06F 1/324* (2013.01); *G06F 1/325* (2013.01); *G10L 15/00* (2013.01);

(Continued)

(58) Field of Classification Search

CPC .................................................... H04R 17/02

(Continued)

(56) References Cited

U.S. PATENT DOCUMENTS

| | | | | |
|---|---|---|---|---|
| 4,052,568 A | | 10/1977 | Jankowski | |
| 4,831,558 A | * | 5/1989 | Shoup ................ | G01M 5/0041 702/188 |

(Continued)

FOREIGN PATENT DOCUMENTS

| | | |
|---|---|---|
| CN | 1083639 A | 3/1994 |
| CN | 1306472 A | 8/2001 |

(Continued)

OTHER PUBLICATIONS

International Search Report and Written Opinion for PCT/US2014/038790, dated Sep. 24, 2014 (9 pages).

(Continued)

*Primary Examiner* — Md S Elahee
(74) *Attorney, Agent, or Firm* — Foley & Lardner LLP

(57) ABSTRACT

A microphone assembly includes an acoustic sensor configured to produce an electrical signal and an electrical circuit including a voice activity detector coupled to an output of the acoustic sensor. The microphone assembly further includes an internal clock signal generator and a host interface coupled to the electrical circuit. The host interface has external connections including an external clock signal and a data connection. The microphone assembly includes an acoustic activity detection mode of operation when the electrical circuit is clocked by the internal clock signal generator in the absence of an external clock signal at the host interface. The microphone assembly has a plurality of operating modes controlled by an external clock signal received in response to an interrupt signal provided by the electrical circuit. The electrical circuit is configured to (Continued)

provide data representing the electrical signal at the host interface when the external clock signal is received.

20 Claims, 3 Drawing Sheets

Related U.S. Application Data continuation of application No. 14/282,101, filed on May 20, 2014, now Pat. No. 9,712,923.

(60) Provisional application No. 61/826,587, filed on May 23, 2013.

(51) Int. Cl.
*H04R 1/08* (2006.01)
*G10L 25/78* (2013.01)
*G10L 15/00* (2013.01)
*H04R 19/00* (2006.01)
*H04R 19/04* (2006.01)
*G06F 1/324* (2019.01)
*G06F 1/3234* (2019.01)

(52) U.S. Cl.
CPC ................ *G10L 25/78* (2013.01); *H04R 1/08* (2013.01); *H04R 3/00* (2013.01); *H04R 19/005* (2013.01); *H04R 19/04* (2013.01); *H04R 2201/003* (2013.01); *Y02D 10/126* (2018.01)

(58) Field of Classification Search
USPC .......................................... 381/110; 702/188
See application file for complete search history.

(56) References Cited

U.S. PATENT DOCUMENTS 5,555,287 A 9/1996 Gulick et al.
5,577,164 A 11/1996 Kaneko
5,598,447 A 1/1997 Usui
5,675,808 A 10/1997 Gulick
5,819,219 A 10/1998 De Vos et al.
5,822,598 A 10/1998 Lam
5,983,186 A 11/1999 Miyazawa
6,049,565 A 4/2000 Paradine
6,057,791 A 5/2000 Knapp
6,070,140 A 5/2000 Tran
6,154,721 A 11/2000 Sonnic
6,249,757 B1 6/2001 Cason
6,259,291 B1 7/2001 Huang
6,282,268 B1 8/2001 Hughes
6,324,514 B2 11/2001 Matulich
6,397,186 B1 5/2002 Bush
6,453,020 B1 9/2002 Hughes
6,564,330 B1 5/2003 Martinez
6,591,234 B1 7/2003 Chandran
6,640,208 B1 10/2003 Zhang
6,756,700 B2 6/2004 Zeng
6,829,244 B1 12/2004 Wildfeuer et al.
7,102,452 B1 9/2006 Holmes
7,190,038 B2 3/2007 Dehe et al.
7,415,416 B2 8/2008 Rees
7,473,572 B2 1/2009 Dehe et al.
7,546,498 B1 6/2009 Tang et al.
7,619,551 B1 11/2009 Wu
7,630,504 B2 12/2009 Poulsen
7,774,202 B2 8/2010 Spengler
7,774,204 B2 8/2010 Mozer
7,781,249 B2 8/2010 Laming et al.
7,795,695 B2 9/2010 Weigold et al.
7,825,484 B2 11/2010 Martin et al.
7,829,961 B2 11/2010 Hsiao
7,856,283 B2 12/2010 Burk
7,856,804 B2 12/2010 Laming et al.
7,903,831 B2 3/2011 Song
7,936,293 B2 5/2011 Hamashita
7,941,313 B2 5/2011 Garudadri
7,957,972 B2 6/2011 Huang
7,994,947 B1 8/2011 Ledzius
8,171,322 B2 5/2012 Fiennes
8,208,621 B1 6/2012 Hsu
8,274,856 B2 9/2012 Byeon
8,275,148 B2 9/2012 Li
8,331,581 B2 12/2012 Pennock
8,666,751 B2 3/2014 Murthi
8,687,823 B2 4/2014 Loeppert
8,731,210 B2 5/2014 Cheng
8,798,289 B1 8/2014 Every
8,804,974 B1 8/2014 Melanson
8,849,231 B1 9/2014 Murgia
8,972,252 B2 3/2015 Hung
8,996,381 B2 3/2015 Mozer
9,020,819 B2 4/2015 Saitoh
9,043,211 B2 5/2015 Haiut
9,059,630 B2 6/2015 Gueorguiev
9,073,747 B2 7/2015 Ye
9,076,447 B2 7/2015 Nandy
9,111,548 B2 8/2015 Nandy et al.
9,112,984 B2 8/2015 Sejnoha
9,113,263 B2 8/2015 Furst
9,119,150 B1 8/2015 Murgia
9,142,215 B2 9/2015 Rosner
9,147,397 B2 9/2015 Thomsen
9,161,112 B2 10/2015 Ye
2002/0054588 A1 5/2002 Mehta
2002/0116186 A1 8/2002 Strauss
2002/0123893 A1 9/2002 Woodward
2002/0184015 A1 12/2002 Li
2003/0004720 A1 1/2003 Garudadri
2003/0061036 A1 3/2003 Garudadri
2003/0138061 A1 7/2003 Li
2003/0144844 A1 7/2003 Colmenarez
2003/0171907 A1 9/2003 Gal-On et al.
2004/0022379 A1 2/2004 Klos
2005/0207605 A1 9/2005 Dehe et al.
2006/0013415 A1 1/2006 Winchester
2006/0074658 A1 4/2006 Chadha
2006/0164151 A1 7/2006 Chatterjee et al.
2006/0233389 A1 10/2006 Mao et al.
2006/0247923 A1 11/2006 Chandran
2007/0127761 A1 6/2007 Poulsen
2007/0168908 A1 7/2007 Paolucci
2007/0274297 A1 11/2007 Cross et al.
2007/0278501 A1 12/2007 MacPherson et al.
2008/0089536 A1 4/2008 Josefsson
2008/0175425 A1 7/2008 Roberts et al.
2008/0201138 A1 8/2008 Visser
2008/0267431 A1 10/2008 Leidl et al.
2008/0279407 A1 11/2008 Pahl
2008/0283942 A1 11/2008 Huang et al.
2009/0001553 A1 1/2009 Pahl et al.
2009/0003629 A1 1/2009 Shajaan et al.
2009/0180655 A1 7/2009 Tien et al.
2009/0234645 A1 9/2009 Bruhn
2009/0257289 A1 10/2009 Byeon
2010/0046780 A1 2/2010 Song
2010/0052082 A1 3/2010 Lee et al.
2010/0057474 A1 3/2010 Kong
2010/0128894 A1 5/2010 Petit
2010/0128914 A1 5/2010 Khenkin
2010/0131783 A1 5/2010 Weng
2010/0183181 A1 7/2010 Wang
2010/0246877 A1 9/2010 Wang et al.
2010/0290644 A1 11/2010 Wu et al.
2010/0292987 A1 11/2010 Kawaguchi
2010/0322443 A1 12/2010 Wu et al.
2010/0322451 A1 12/2010 Wu et al.
2011/0007907 A1 1/2011 Park
2011/0013787 A1 1/2011 Chang
2011/0029109 A1 2/2011 Thomsen
2011/0075875 A1 3/2011 Wu et al.
2011/0106533 A1 5/2011 Yu

(56) References Cited

U.S. PATENT DOCUMENTS

2011/0107010 A1 5/2011 Strauss et al.
2011/0170714 A1 7/2011 Hanzlik et al.
2011/0208520 A1 8/2011 Lee
2011/0280109 A1 11/2011 Raymond
2011/0293115 A1 12/2011 Henriksen
2012/0010890 A1 1/2012 Koverzin
2012/0112804 A1 5/2012 Li et al.
2012/0113899 A1 5/2012 Overmars
2012/0177227 A1 7/2012 Adachi
2012/0232896 A1 9/2012 Taleb
2012/0250881 A1 10/2012 Mulligan
2012/0250910 A1 10/2012 Shajaan et al.
2012/0310641 A1 12/2012 Niemisto
2013/0035777 A1 2/2013 Niemisto et al.
2013/0044898 A1 2/2013 Schultz
2013/0058495 A1 3/2013 Furst et al.
2013/0058506 A1 3/2013 Boor
2013/0195291 A1 8/2013 Josefsson
2013/0223635 A1 8/2013 Singer
2013/0226324 A1 8/2013 Hannuksela et al.
2013/0246071 A1 9/2013 Lee
2013/0322461 A1 12/2013 Poulsen
2013/0343584 A1 12/2013 Bennett et al.
2014/0064523 A1 3/2014 Kropfitsch
2014/0122078 A1 5/2014 Joshi
2014/0143545 A1 5/2014 McKeeman
2014/0163978 A1 6/2014 Basye
2014/0177113 A1 6/2014 Gueorguiev
2014/0188467 A1 7/2014 Jing
2014/0188470 A1 7/2014 Chang
2014/0197887 A1 7/2014 Hovesten
2014/0244269 A1 8/2014 Tokutake
2014/0244273 A1 8/2014 Laroche et al.
2014/0249820 A1 9/2014 Hsu
2014/0257813 A1 9/2014 Mortensen
2014/0257821 A1 9/2014 Adams
2014/0270260 A1 9/2014 Goertz et al.
2014/0274203 A1 9/2014 Ganong
2014/0278435 A1 9/2014 Ganong et al.
2014/0281628 A1 9/2014 Nigam
2014/0343949 A1 11/2014 Huang
2014/0348345 A1 11/2014 Furst
2014/0358552 A1 12/2014 Xu
2015/0039303 A1 2/2015 Lesso
2015/0043755 A1 2/2015 Furst
2015/0046157 A1 2/2015 Wolff
2015/0046162 A1 2/2015 Aley-Raz
2015/0049884 A1 2/2015 Ye
2015/0055803 A1 2/2015 Qutub
2015/0058001 A1 2/2015 Dai
2015/0063594 A1 3/2015 Nielsen
2015/0073780 A1 3/2015 Sharma
2015/0073785 A1 3/2015 Sharma
2015/0088500 A1 3/2015 Conliffe
2015/0106085 A1 4/2015 Lindahl
2015/0110290 A1 4/2015 Furst
2015/0112690 A1 4/2015 Guha
2015/0134331 A1 5/2015 Millet
2015/0154981 A1 6/2015 Barreda
2015/0161989 A1 6/2015 Hsu
2015/0195656 A1 7/2015 Ye
2015/0206527 A1 7/2015 Connolly
2015/0256660 A1 9/2015 Kaller
2015/0256916 A1 9/2015 Volk
2015/0287401 A1 10/2015 Lee
2015/0302865 A1 10/2015 Pilli
2015/0304502 A1 10/2015 Pilli
2015/0350760 A1 12/2015 Nandy
2015/0350774 A1 12/2015 Furst
2016/0012007 A1 1/2016 Popper
2016/0087596 A1 3/2016 Yurrtas
2016/0133271 A1 5/2016 Kuntzman
2016/0134975 A1 5/2016 Kuntzman

FOREIGN PATENT DOCUMENTS

CN 1868118 A 11/2006
CN 102272826 A 12/2011
CN 102568480 A 7/2012
CN 102770909 A 11/2012
CN 102983868 A 3/2013
CN 103117065 A 5/2013
JP 2001236095 8/2001
JP 2001236095 A 8/2001
JP 2004219728 8/2004
WO WO-90/13890 A1 11/1990
WO WO-02/03747 A2 1/2002
WO WO-02/061727 8/2002
WO WO-2005/009072 A2 1/2005
WO 2009130591 1/2009
WO 2011106065 1/2011
WO 2011140096 2/2011
WO 2013049358 1/2013
WO 2013085499 1/2013

OTHER PUBLICATIONS

U.S. Appl. No. 14/285,585, filed May 22, 2014, Santos.
U.S. Appl. No. 14/495,482, filed Sep. 24, 2014, Murgia.
U.S. Appl. No. 14/522,264, filed Oct. 23, 2014, Murgia.
U.S. Appl. No. 14/698,652, filed Apr. 28, 2015, Yapanel.
U.S. Appl. No. 14/749,425, filed Jun. 24, 2015, Verma.
U.S. Appl. No. 14/853,947, filed Sep. 14, 2015, Yen.
U.S. Appl. No. 62/100,758, filed Jan. 7, 2015, Rossum.
International Search Report and Written Opinion for PCT/US2016/013859 dated Apr. 29, 2016 (12 pages).
Search Report of Taiwan Patent Application No. 103135811, dated Apr. 18, 2016 (1 page).
"MEMS technologies: Microphone" EE Herald Jun. 20, 2013.
Delta-sigma modulation, Wikipedia (Jul. 4, 2013).
International Search Report and Written Opinion for PCT/EP2014/064324, dated Feb. 12, 2015 (13 pages).
International Search Report and Written Opinion for PCT/US2014/060567 dated Jan. 16, 2015 (12 pages).
International Search Report and Written Opinion for PCT/US2014/062861 dated Jan. 23, 2015 (12 pages).
Kite, Understanding PDM Digital Audio, Audio Precision, Beaverton, OR, 2012.
Pulse-density modulation, Wikipedia (May 3, 2013).

* cited by examiner

VAD DETECTION MICROPHONE AND METHOD OF OPERATING THE SAME

CROSS REFERENCE TO RELATED APPLICATIONS

This application is a continuation of prior application Ser. No. 14/522,158, filed Oct. 23, 2014, which is a continuation of prior U.S. application Ser. No. 14/282,101, entitled "VAD detection Microphone and Method of Operating the Same," filed May 20, 2014, which claims the benefit under 35 U.S.C. § 119 (e) to U.S. Provisional Application No. 61/826,587, filed May 23, 2013, the content of all of which are incorporated herein by reference in their entireties.

TECHNICAL FIELD

This application relates to microphones and, more specifically, to voice activity detection (VAD) approaches used with these microphones.

BACKGROUND

Microphones are used to obtain a voice signal from a speaker. Once obtained, the signal can be processed in a number of different ways. A wide variety of functions can be provided by today's microphones and they can interface with and utilize a variety of different algorithms.

Voice triggering, for example, as used in mobile systems is an increasingly popular feature that customers wish to use. For example, a user may wish to speak commands into a mobile device and have the device react in response to the commands. In these cases, a programmable digital signal processor (DSP) will first use a voice activity detection algorithm to detect if there is voice in an audio signal captured by a microphone, and then, subsequently, analysis is performed on the signal to predict what the spoken word was in the received audio signal. Various voice activity detection (VAD) approaches have been developed and deployed in various types of devices such as cellular phone and personal computers.

In the use of these approaches, power consumption becomes a concern. Lower power consumption gives longer standby time. For today's smart-phones (in particular), the use of power is a key parameter. Unfortunately, present approaches of operating microphones use and waste much power. This has resulted in user dissatisfaction with these previous approaches and systems.

BRIEF DESCRIPTION OF THE DRAWINGS

For a more complete understanding of the disclosure, reference should be made to the following detailed description and accompanying drawings wherein.

Figure 1:
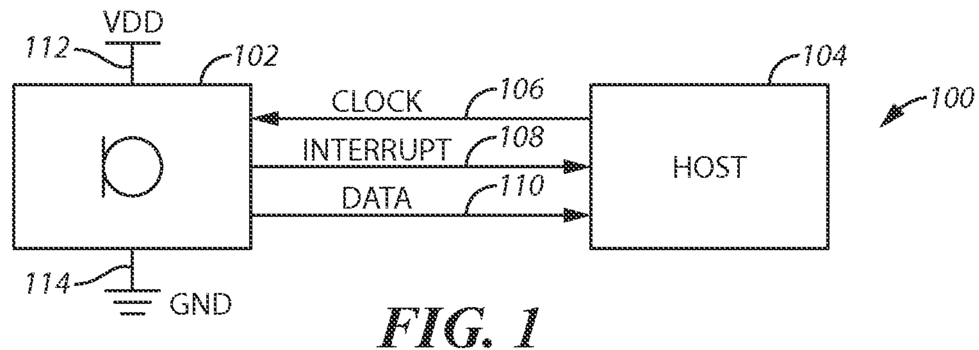
FIG. 1 comprises a block diagram of a system with a microphone that uses a VAD algorithm and includes power savings features according to various embodiments of the present invention.

Skilled artisans will appreciate that elements in the figures are illustrated for simplicity and clarity. It will be further appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The present approaches change the way that present mobile systems are partitioned, the functionality of the microphone, and the modes in which it can operate. In these regards, a microphone with a voice or event detection block is presented and this enables the microphone to generate an interrupt signal which can wake the system up.

In some aspects, the microphones described herein include five external connections. The first connection may be a power connection and the second connection may be a ground connection. The third, fourth, and fifth connections are connections from the microphone to a host device (e.g., host circuitry in the device in which the microphone resides). More specifically, the third connection may be a data connection, the fourth connection may be an interrupt (sent from the microphone to the host), and the fifth connection may be a clock signal (sent from the host to the microphone).

The microphone may have several modes of operation and these are controlled by a clock signal. The host receives a data signal from the microphone as well as an interrupt signal. The host has multiple power modes controlled by the interrupt signal generated by the microphone. The host generates the clock signal for the microphone and thereby controls the mode of operation of the microphone. In one example, the absence of a clock causes the microphone to enter voice activity detection (VAD) mode.

In one example, the microphone includes a VAD mode of operation. In this mode of operation, the microphone has a very low power consumption, and it runs on a relatively low clock frequency which can be supplied either externally (from the host) or from an on-chip oscillator.

This operation enables very low power consumption levels as only the most necessary signal processing is active during this mode. In one aspect, the analog signal processing blocks of the microphone (such as the microphone preamplifier, the analog to digital converter, the voltage regulators and the charge pump supplying the bias voltage for the MicroElectroMechanicalSystem (MEMS) microphone) operate at lower power. In this mode, these blocks are operated at reduced power enough for achieving the bandwidth and signal to noise ratio (SNR) needed for the VAD or event detector to function. For example, a bandwidth of operation of approximately 8 kHz after decimation and an SNR of approximately 60 dB can be achieved.

The VAD or event detector can be implemented using well known techniques. For example, short term energy measures vs. long term energy measures, zero crossing and so forth can be used to detect voice signals.

It should also be noted that the interface (the connections between the host and the microphone) is not limited to the exact signals described herein. In these regards, other signals or other combinations of signals may be used. The physical implementation of the interface may also vary. For example, it may be a single physical bi-directional line, or multiple uni-directional lines.

In other aspects, the microphone further includes a delay buffer. In other examples, upon wake up, buffered data is transmitted over a first transmission line and real-time data is transmitted simultaneously over a second and separate output line. In still other examples, buffered data is flushed or discarded upon switching modes.

In still other aspects, the microphone is over-clocked to catch up buffered data to real-time data. The microphone can also be used for multi-microphone voice triggered applications. In one example, the microphone wakes up and enables data synchronizations of a second microphone either in a buffered or a real-time mode.

Referring now to FIG. 1, a system 100 that uses a microphone 102 having a VAD algorithm and includes power savings features is described. The microphone 102 may be, in one example, a MEMS chip (with MEMS die, diaphragm, and charge plate) and an application specific integrated circuit (ASIC). The system also includes a host 104. The host 104 may include various processing functions and may be part of a device (e.g., a personal computer or cellular phone, mobile handset, or tablet) where the microphone 102 resides.

A VDD power signal 112 and a ground signal 114 are coupled to the microphone 102. An interrupt signal 108 and a data signal 110 are sent from the microphone 102 to the host 104. A clock signal 106 is sent from the host 104 to the microphone 102.

In one example of the operation of the system 100 of FIG. 1, the microphone 102 has several modes of operation and these are controlled by the clock signal 106. The host 104 receives the data signal 110 from the microphone 102 as well as an interrupt signal 108. The host 104 has multiple power modes controlled by the interrupt signal 108 that is generated by the microphone 102 upon the detection of voice activity or a particular voice event (e.g., a specific spoken word). The host 104 generates the clock signal 106 for the microphone 102 and thereby controls the mode of operation of the microphone 102.

In one example, the microphone 102 includes a VAD mode of operation. In this mode, the microphone 102 has a very low power consumption, and it runs on a relatively low clock frequency which can be supplied either externally (from the clock signal 106 supplied by the host 104) or from an internal on-chip oscillator in the microphone 102. Consequently, when an interrupt is made, the low power operation can be changed to a higher powered mode of operation. As will be recognized, the interrupt allows the system to be operated in both a low power mode of operation and a high power mode of operation.

In some aspects, the integrated circuit and the MEMS circuit receive a clock signal from an external host. The clock signal is effective to cause the MEMS circuit and integrated circuit to operate in full system operation mode during a first time period and in a voice activity mode of operation during a second time period. The voice activity mode has a first power consumption or level and the full system operation mode has a second power consumption or level. The first power consumption is less than the second power consumption. The integrated circuit is configured to generate an interrupt upon the detection of voice activity, and send the interrupt to the host. The absence of a clock causes the microphone to enter a voice activity detection mode. The clock circuit may be located on the same chip as the other components or located externally.

In other aspects, the present approaches provide the ability to operate the internal clock at a third power consumption or level and thereafter generate an external data stream and clock to signal the system to operate at a fourth power consumption or level. The third power level is less than the fourth power level, and the fourth power level is less than the first power level.

In still other aspects, the external clock may be detected and this may be applied after the detection of voice activity. Then, the internal clock is synchronized to the external clock. Furthermore, the VAD signal processing is also synchronized to the external clock after synchronization.

In yet other aspects, the system may fall back to the internal clock for power savings at the first or second power level when the external clock is removed to reduce overall system power.

In another example, an external signal may be generated from the internal combination of the clock and the acoustic activity detection that acts as a signal and clock combination to signal the host to interrupt/wake up and recognize the voice signal. The bandwidth of the input signal after buffering may be in one example approximately 8 kHz. Other examples are possible. Data may be provided in PCM or PDM formats. Other examples of formats are possible.

Figure 2:
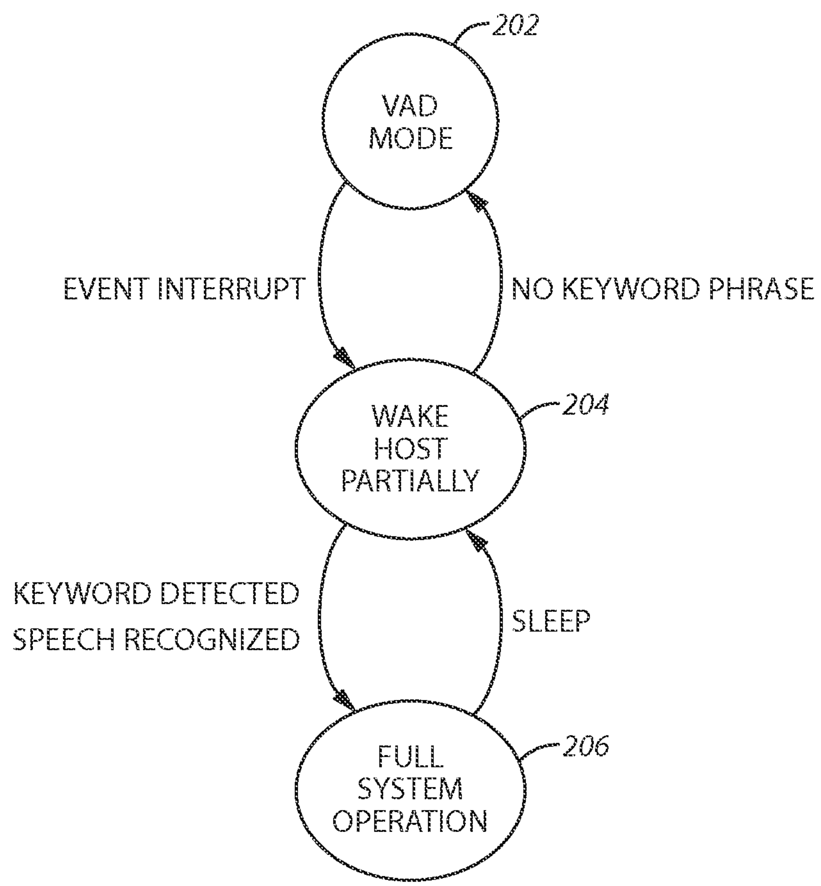
FIG. 2 comprises a diagram of the various states of a system that uses a microphone that uses a VAD algorithm and includes power savings features according to various embodiments of the present invention.

Referring now to FIG. 2 various operational states of a system that uses a microphone that uses a VAD algorithm is described. The approach of FIG. 2 has three modes of operation: a VAD mode 202, a wake up host (partially) mode 204, and a full system operation mode 206.

In the VAD mode 202, no data is transmitted out of the microphone. The host is sleeping in this mode. In one aspect, when the host is sleeping only the functionality needed to react to a generated interrupt signal from the microphone is enabled. In this mode, the host is clocked at a very low clock to lower power and all unnecessary functionality is powered down. This mode has the absolute lowest power consumption possible as all unnecessary blocks are powered down and no switching of clock or data signals occur. In other words, the mode 202 is a low power mode, where VAD is enabled and no external clock is being received from the host.

In the wake up host (partially) mode 204, the external clock is received from the host. Data is transmitted out of the microphone. The host becomes partially awake due to the detection of a keyword and/or the detection of voice activity. Subsequently, the external clock for the microphone is enabled with a clock frequency corresponding to a higher performance level enough for doing reliable keyword detection.

The full system operation mode 206 is the high power or standard operating mode of the microphone.

In one example of the operation of the state transition diagram of FIG. 2, the system begins in mode 202. The VAD algorithm detects an event which will trigger the transition from VAD mode 202 to partially wake up/wake up mode 204.

In the mode 204, the host detects a keyword/speech and decides that a specific key word, phrase, or sentence is recognized. This determination triggers the transition from the mode 204 to the full system wake up 206.

In the mode 206, the host keyword detect/speech recognition algorithm decides that no key word, phrase, or sentence is recognized which triggers the transition back to the VAD mode 202. In this respect, another mode or state (not shown here in FIG. 2) determines that the system should enter partially wake up/wake up mode 204 or go directly to the VAD mode 202.

Figure 3:
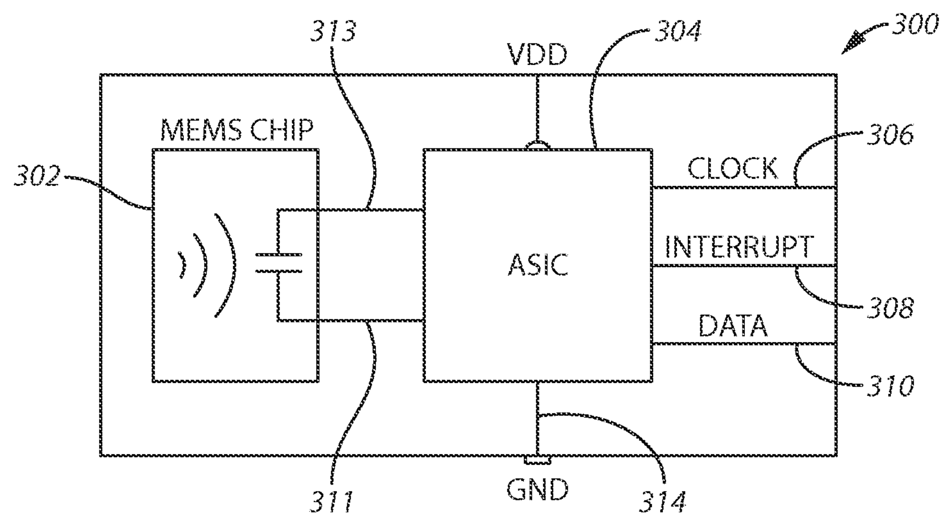
FIG. 3 comprises a block diagram of a microphone that uses a VAD algorithm and includes power savings features according to various embodiments of the present invention.

Referring now to FIG. 3, a microphone 300 that uses a VAD algorithm and includes power savings features is described. The microphone 300 includes a microphone chip or device 302. The microphone chip 302 includes a MEMS die, diaphragm, and charge plate. The system also includes an ASIC 304. The ASIC 304 may include various processing functions. The MEMS chip 302 receives a charge pump signal 315 from the ASIC 304 to power the MEMS chip 302.

A VDD power signal 312 and a ground signal 314 are coupled to the ASIC 304. An interrupt signal 308 and a data signal 310 are sent by the ASIC 304 to a host (e.g., the host 104 of FIG. 1). A clock signal 306 sent from the host is received by the ASIC 304.

In one example of the operation of the microphone 300 of FIG. 3, the microphone 300 has several modes of operation and these are controlled by the clock signal 306. A voice signal is received by the MEMS chip 302 and this sound is converted into an electrical signal and sent over data lead 311 to the ASIC 304. The ASIC 304 processes the signal into a data signal and then transmits the data signal 310 from the ASIC 304 as well as creating an interrupt signal 308. The host (e.g., the host 104 of FIG. 1) generates the clock signal 306 and this controls the mode of operation of the microphone 300.

In one example, the microphone 300 includes a VAD mode of operation. In this mode, the microphone 300 has a very low power consumption, and it runs on a relatively low clock frequency which can be supplied either externally (from the clock signal 306 supplied by the host) or from an internal on-chip oscillator in the microphone 300. Consequently, when an interrupt is made, the low power operation can be changed to a higher powered operation. The interrupt allows the system to be operated in both a low power mode of operation and a high power mode of operation.

Figure 4:
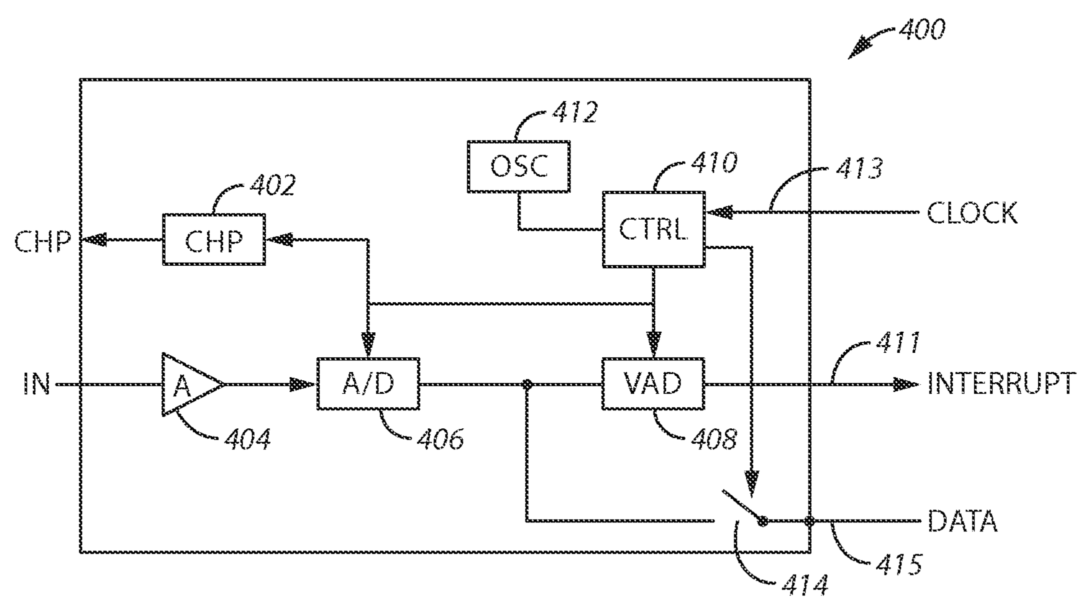
FIG. 4 comprises a block diagram of an application specific integrated circuit (ASIC) according to various embodiments of the present invention.

Referring now FIG. 4, a block diagram of an application specific integrated circuit (ASIC) 400 is described. The ASIC 400 includes a charge pump (CHP) 402, an amplifier 404, an analog-to-digital converter 406, a voice activity detector (VAD) 408, a control block 410 (with oscillator 412), and a switch 414.

The charge pump CHP 402 charges the MEMS element (e.g., the MEMS chip 302 of FIG. 3) to convert changes in capacitance to voltage. The amplifier 404 buffers the electrical signal of the MEMS element (e.g., the MEMS chip 302 of FIG. 3) and subsequently amplifies the signal with a gain of A.

The A/D converter 406 converts the analog signal from the amplifier 404 to a digital signal. The VAD 408 processes the digital signal from the A/D converter 406 and generates an interrupt signal 411 if voice is detected. The control block 410 controls the internal states of the ASIC 400 in response to an external clock signal 413 (received from a host) and the interrupt signal 411 from the VAD 408. The switch 414 is controlled by the control block 410 to allow data 415 to be sent to an external host.

A data buffer may be included at the output of the A/D converter 406. The buffer may buffer data representing the audio signal and correspond to or approximate the delay of the VAD 408 (e.g., 10 ms-360 ms to mention one example range with other ranges being possible). A decimation filter stage could be included at the output of the A/D converter in order to reduce buffer size (sampler RAM) and power, this will limit the bandwidth. In this case an interpolation stage at the buffer output must be added as well. In this case, the delay may be around 200 msec. In another example, the delay may be around 360 msec. Other examples of delay values are possible. The buffer is provided to allow any recognition algorithm the latency required to wake up the host, collect sufficient background noise statistics, and recognize the key phrase within the ambient noise.

The buffered data may be sent to the host via some connection such as the interrupt line 411 or the data line 415. If sending data via the data line 415, it may be sent at an increased clock rate compared to the sampling clock.

Additionally, the parameters or settings of the VAD 408 may be changed or controlled. For example, the reading or writing settings of registers and memory (both erasable and non-erasable) of the VAD 408 may be changed or controlled to, for example, account for various levels of background noise.

The functionality of the VAD 408 may be enhanced or changed. For example, voice or phrase detection may be used. Other functions may also be included.

Figure 5:
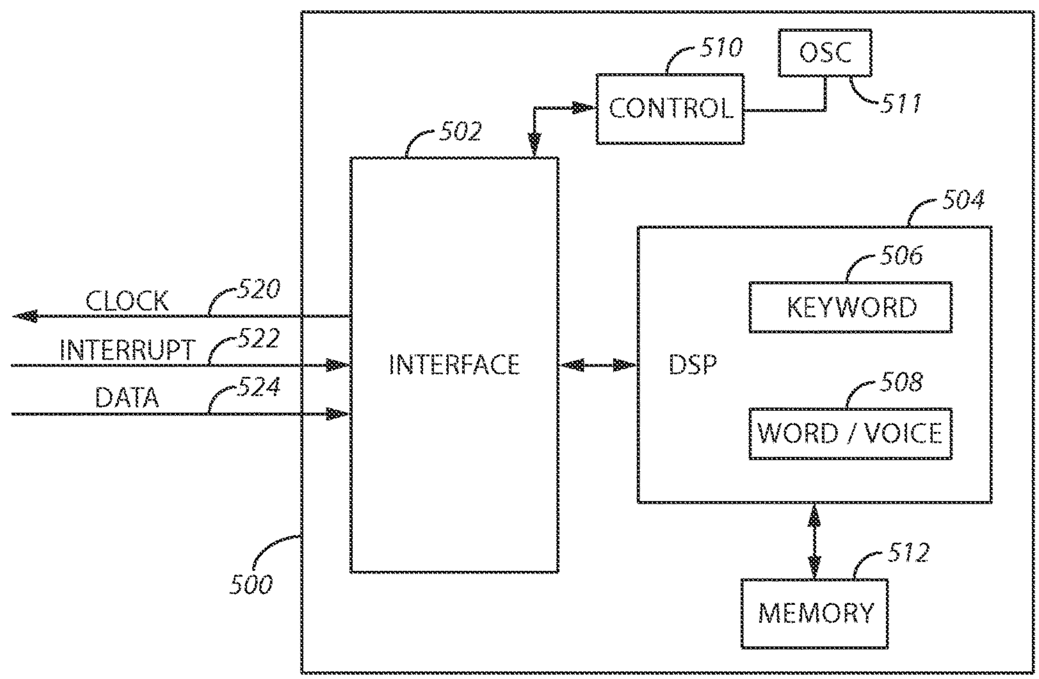
FIG. 5 comprises a block diagram of a host device according to various embodiments of the present invention.

Referring now FIG. 5, a block diagram of host 500 is described. The host 500 includes an interface block 502, a digital signal processing (DSP) block 504 (including a keyword detection block 506 and word/voice recognition block 508), a control block 510 (clocked by an on-chip oscillator 511), and a memory 512.

The interface block 502 provides interfacing functionality with respect to a microphone (e.g., the microphone 102 in FIG. 1). The interface block transmits the clock signal 520 to the microphone and receives from the microphone an interrupt signal 522 and a data signal 524. The DSP block processes the data signal in two steps using the keyword detection block 506 (detecting a keyword) and the word/voice recognition block 508 (detecting a word or voice).

The control block 510 controls the power states of the microphone (e.g., the microphone 102 of FIG. 1), the blocks of the host 500, and the entire system including other blocks and functions outside the host and microphone (not shown here in FIG. 5).

The memory 512 stores the states of the system, data, and other information. The on chip oscillator 511 is controllable from the control block 510 and enables at least two clock modes corresponding to at least two power modes.

Figure 6:
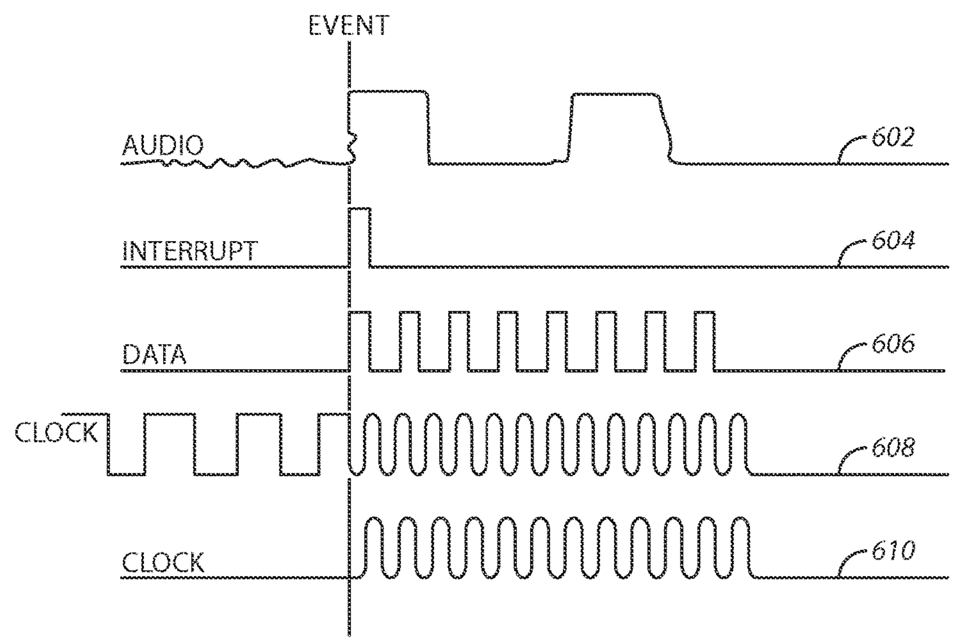
FIG. 6 comprises a timing diagram showing the operation of a microphone that uses a VAD algorithm and includes power savings features according to various embodiments of the present invention.

Referring now FIG. 6, a timing diagram showing the operation of a microphone that uses a VAD algorithm and includes power savings features is described. The signals of FIG. 6 show how the system and in particular how the microphone reacts to a voice/event signal and generates an interrupt signal. Subsequent to the interrupt signal, the diagrams show how the host reacts to the interrupt signal by changing its mode and afterwards changing the frequency of the clock signal to change the mode of the microphone.

Signal 602 shows an audio signal. Upon detection of an audio signal, the microphone generates an interrupt as shown by signal 604. Data is also generated by the microphone as shown by signal 606. As can be seen by signal 608, the host in response to the interrupt changes the clock signal (sent to the microphone) from a low frequency signal to a high frequency signal. Alternatively (as shown by signal 610), in low power mode (before the event), the host may not send a clock signal and may only start the high frequency clock signal upon detection of the event.

Preferred embodiments of this disclosure are described herein, including the best mode known to the inventors. It should be understood that the illustrated embodiments are exemplary only, and should not be taken as limiting the scope of the appended claims.

What is claimed is:

1. A microphone assembly comprising:

an acoustic sensor configured to produce an electrical signal at an output of the acoustic sensor in response to sensing an acoustic signal;

an electrical circuit including an acoustic activity detector, the electrical circuit having an input coupled to the output of the acoustic sensor, the electrical circuit configured to process the electrical signal to generate data representing the electrical signal;

an internal clock signal generator coupled to the electrical circuit;

a host interface with external connections coupled to the electrical circuit, the external connections including a connection for an external clock signal and data;

the microphone assembly having an acoustic activity detection mode of operation when the electrical circuit is clocked by the internal clock signal generator in the absence of an external clock signal at the host interface, the electrical circuit configured to provide an interrupt signal to the host interface upon detection of an acoustic event by the electrical circuit, the microphone assembly having a plurality of operating modes with different power consumptions, the plurality of operating modes controlled by an external clock signal received at the host interface in response to providing the interrupt signal, wherein the electrical circuit is configured to provide the data representing the electrical signal to the host interface when the external clock signal is received at the host interface.

2. The microphone assembly of claim 1, the electrical circuit including a data buffer, wherein the electrical circuit is configured to buffer data representing the electrical signal in the data buffer during the acoustic activity detection mode of operation and the electrical circuit is configured to provide the buffered data to the host interface after the interrupt signal is provided to the host interface.

3. The microphone assembly of claim 2, the electrical circuit including an analog-to-digital converter having an input coupled to the output of the acoustic sensor, the analog-to-digital converter including an output coupled to the acoustic activity detector and to the data buffer.

4. The microphone assembly of claim 3, the acoustic sensor is a microelectromechanical systems (MEMS) transducer and the electrical circuit is an integrated circuit.

5. The microphone assembly of claim 4, the MEMS transducer is a capacitive device and the electrical circuit includes a charge pump having a bias signal output coupled to the capacitive device.

6. The microphone assembly of claim 2, the acoustic activity detection mode of operation has lower power consumption than the plurality of operating modes controlled by the external clock signal.

7. The microphone assembly of claim 2, the electrical circuit is configured to provide buffered data to the host interface when the external clock signal is received at the host interface.

8. The microphone assembly of claim 7, wherein the electrical circuit is overclocked to catch up buffered data provided to the host interface to real time.

9. The microphone assembly of claim 2, wherein the electrical circuit is clocked by the internal clock signal generator in the absence of the external clock signal at the host interface and the electrical circuit is clocked by the external clock signal when the external clock signal is received at the host interface.

10. A microphone assembly comprising:

an acoustic sensor;

an electrical circuit having an input coupled to an output of the acoustic sensor, the electrical circuit including an acoustic activity detector;

an internal clock signal generator coupled to the electrical circuit;

a host interface with external connections coupled to the electrical circuit, the host interface including a connection for an external clock signal and data;

the acoustic activity detector configured to process, in an acoustic activity detection mode, data representing an electrical signal output by the acoustic sensor for acoustic activity when the electrical circuit is clocked by a clock signal from the internal clock signal generator in the absence of an external clock signal on the host interface, the electrical circuit configured to provide an interrupt signal to the host interface after detection of an acoustic event, and the electrical circuit configured to control an operating mode of the microphone assembly based on an external clock signal received at the host interface in response to the interrupt signal, the microphone assembly having a plurality of different power consumption modes, wherein the electrical circuit is configured to provide the data representing the electrical signal to the host interface when the external clock signal is received at the host interface.

11. The microphone assembly of claim 10, the electrical circuit including a data buffer, wherein the electrical circuit is configured to buffer data representing the electrical signal in the data buffer during operation in the acoustic activity detection mode and the electrical circuit is configured to provide the buffered data to the host interface after the interrupt signal is provided to the host interface.

12. The microphone assembly of claim 11, the electrical circuit is configured to provide buffered data to the host interface when the external clock signal is received at the host interface.

13. The microphone assembly of claim 11, wherein the electrical circuit is overclocked to catch up buffered data provided to the host interface to real time.

14. The microphone assembly of claim 11, wherein the electrical circuit is clocked by the internal clock signal generator in the absence of the external clock signal at the host interface and the electrical circuit is clocked by the external clock signal when the external clock signal is received at the host interface.

15. The microphone assembly of claim 11, the acoustic activity detection mode of operation has lower power consumption than other operating modes of the microphone assembly.

16. The microphone assembly of claim 11, the electrical circuit including an analog-to-digital converter having an input coupled to the output of the acoustic sensor, the analog-to-digital converter including an output coupled to the acoustic activity detector and to the data buffer.

17. The microphone assembly of claim 16, the acoustic sensor is a microelectromechanical systems (MEMS) transducer and the electrical circuit is an integrated circuit.

18. The microphone assemble of claim 17, the acoustic activity detection mode of operation has lower power consumption than an operating mode controlled by the external clock signal.

19. The microphone assembly of claim 10, wherein the electrical circuit is overclocked to catch up buffered data provided to the host interface to real time.

20. A microphone assembly comprising:

a microelectromechanical systems (MEMS) transducer;

an electrical circuit including an acoustic activity detector, an A/D converter and a data buffer, an output of the MEMS transducer coupled to an input of the A/D converter and an output of the A/D converter coupled to the acoustic activity detector and the data buffer;

an internal clock signal generator coupled to the electrical circuit;

a host interface with external connections coupled to the electrical circuit, the host interface including a connection for an external clock signal and data;

the microphone assembly having an acoustic activity detection mode when the electrical circuit is clocked by the internal clock signal generator in the absence of an external clock signal at the host interface, wherein during acoustic activity detection mode the electrical circuit is configured to process data representing an electrical signal output by the MEMS transducer for acoustic activity while data representing the electrical signal output by the MEMS transducer is buffered in the data buffer, the electrical circuit configured to provide an interrupt signal to the host interface after detection of an acoustic event and the electrical circuit configured to control an operating mode of the microphone assembly based on an external clock signal received at the host interface in response to the interrupt signal, the microphone assembly having a plurality of different power consumption modes, wherein buffered data is provided to the host interface in an operating mode when the external clock signal is received at the host interface.

* * * * *